UNITED STATES PATENT OFFICE.

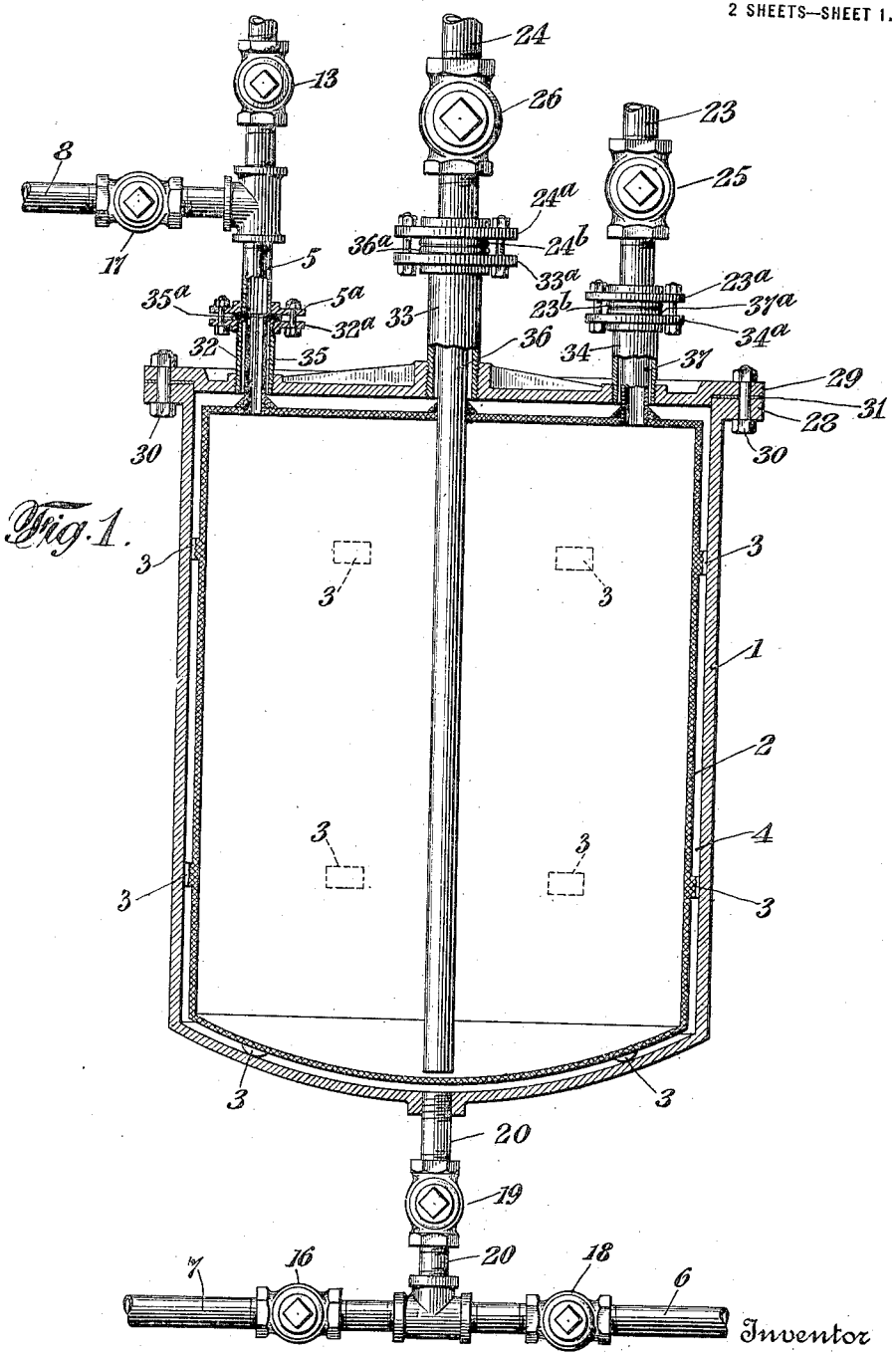

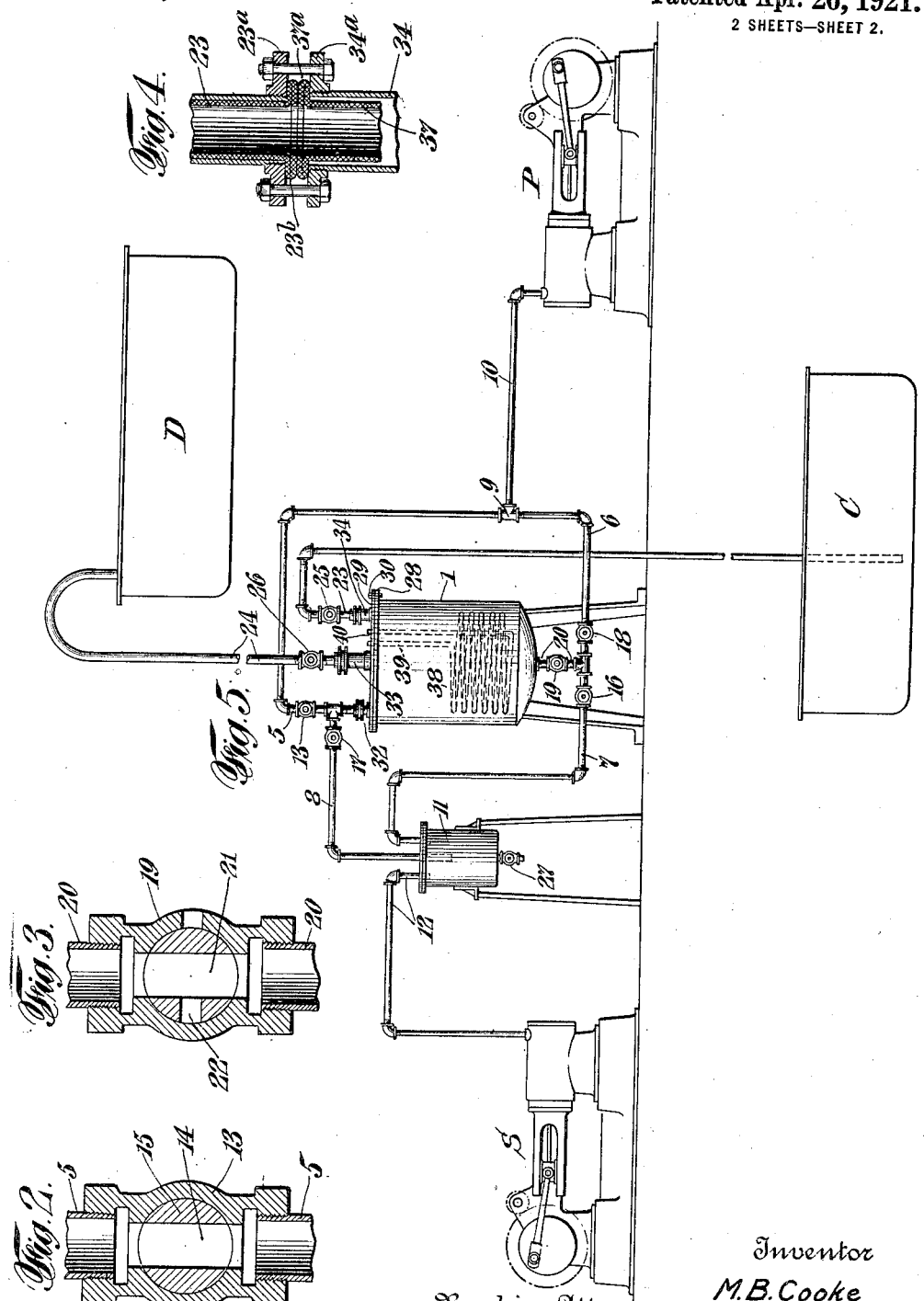

MAURICE B. COOKE, OF CARNEYS POINT, NEW JERSEY, ASSIGNOR TO E. I. DU PONT DE NEMOURS & COMPANY, OF WILMINGTON, DELAWARE, A CORPORATION OF DELAWARE.

BLOW-CASE.

1,376,188.   Specification of Letters Patent.   Patented Apr. 26, 1921.

Application filed September 27, 1919. Serial No. 326,833.

*To all whom it may concern:*

Be it known that I, MAURICE B. COOKE, a citizen of the United States, and a resident of Carneys Point, in the county of Salem and State of New Jersey, have invented a certain new and useful Blow-Case, of which the following is a specification.

This invention relates to liquid handling apparatus and has more particular relation to a blow case or egg.

As is understood in the art, a blow case comprises, in general, a liquid container having provision for the application of gas or air pressure to the contained liquid thereby to force the liquid out of the container. Such an egg is commonly used as a substitute for a pump in the handling of corrosive liquids such as sulfuric acid. The egg is, commonly, constructed of iron or steel having the strength to resist the fluid pressure. But, for use with liquids, as sulfuric acid, which would corrode iron or steel, the egg should be lined with a different material, as lead, applied to the shell of iron or steel. But these lining materials are, frequently, not of great rigidity. The difficulty is, then, that such eggs are unsatisfactory for use in raising liquid from a lower level into the egg by the application of suction, for in such cases the lining is drawn away from the shell, causing leaks in, or complete collapse of, the lining. I have devised a lined egg in which all inequalities of pressure on the lining are eliminated, whereby the egg can be used for the lifting of liquids from a level lower than that of the egg, for drawing of liquid through a filtering medium, and so forth, without injury to the lining of the egg.

One object of the invention is to provide a lined blow egg having a lining which is at all times free from inequalities of pressure.

Another object is to provide a blow egg having a lining that will not buckle or collapse when the egg is subjected to evacuation, partial or complete.

Another object is to provide an apparatus for the handling of liquid and including a blow egg whose lining is at all times free from inequalities of pressure.

To these ends, and also to improve generally upon devices of the character indicated, my invention consists in the following matters hereinafter described and claimed.

Without restricting my invention thereto, I describe it by reference to the accompanying drawings illustrating an embodiment thereof.

In the drawings:—

Figure 1 is a somewhat conventional view, principally in diametrical sectional elevation, of a blow egg construction in accordance with my invention;

Fig. 2 is a section, crosswise of the valve plug, of a representative one of the two-way valves;

Fig. 3 is a section, crosswise of the valve plug, of the three-way valve;

Fig. 4 is a detail sectional view of a representative one of the pipe connections, and Fig. 5 is a conventional diagrammatic side elevational assembly of an arrangement including an egg, constructed in accordance with my invention.

The shell, or outer receptacle, 1, (Fig. 1) of the egg is of material capable of withstanding the degrees of pressure and vacuum to be used, as of iron or steel. The lining, or inner receptacle, 2, of lead or whatever material is desirable for contact with the liquid to be handled, is received within the shell 1. And it is spaced all about from the shell 1, as by lugs, as 3, on the lining 2, to provide the space 4. This space 4 permits the application of the same pressure to the outer side of the lining as to the inner side. The pressure pipes 5 and 6 are for the introduction of fluid under pressure, *i. e.* absolute pressure above atmospheric, as gas or air, to the inner and outer sides of the lining, the pressure through the pipe 5—35 serving to force the handled liquid out of the receptacle. The suction pipes, 7 and 8, are for the application of suction, *i. e.* absolute pressure below atmospheric, to the inner and outer sides of the lining, the suction through the pipe 8 serving to draw liquid into the receptacle. The pipes 5 and 6 are "teed" at 9 to the fluid supply pipe 10, so that they are in communication with each other and the pipe 10. Air or gas under pressure is supplied to the pipe 10 by any suitable means as the compressor P (Fig. 5). The pipe 8 communicates with the inner side of the lining through the lower end of the pipe 5—35. Conveniently, a catch box 11 is provided, to which suction is applied through the pipe 12 by any suitable means as the vacuum pump S (Fig. 5), the pipes 7 and 8 enter the catch box and are placed in communication thereby.

A two-way, or straight-way valve, 13, say such as illustrated in Fig. 2, and having a single passage 14 through its plug 15, is inserted in the pipe 5 above its connection with the pipe 8. Similar valves 16, 17, and 18, are inserted in the pipes 7, 8, and 6, as indicated. A three-way valve, 19, such, for example, as that illustrated in Fig. 3, is inserted in the pipe 20 that connects the pipes 6 and 7 with the outer side of the lining, or space 4. This valve has the through passage 21 and side passage 22, the latter for communication with the atmosphere for drawing any condensation from the space 4.

The pipe 23—37 is the entrance pipe for the liquid to be handled and the pipe 24—36, extending nearly to the bottom of the receptacle, is the discharge pipe for the liquid. Each pipe is provided with a two-way valve, 25 or 26, similar, preferably, to the valve 13. Both the receptacles 1 and 2 are fully closed from the atmosphere and from each other, except for such communication as is afforded by the piping and valves described.

The apparatus, as above described, provides for the handling of liquid, under suction and under pressure without the creation of any inequalities of pressure on the lining. This will be evident from a brief statement of the operation:—With the valves 13, 26, and 18, closed, the valves 17, 25, 16, open, and the valve 19 open so that the through passage 21 places the space 4 and the valve 16 in communication and the passage 22 is closed (Fig. 3), suction is applied through the pipe 12 and, so, to pipes 7 and 8, and the charge drawn in from the container C (Fig. 5). It will be seen that the reduced pressure or amount of vacuum is the same on the inside and on the outside of the lining. Also, as the suction is released, the pressure is kept equalized on the inside and on the outside of the lining, due to the fact that pipes 7 and 8 are in communication by way of the box 11. In blowing the charge, the valves 17, 25, and 16, are closed, the valves 13, 18, and 26 opened, and the valve 19 opened so that its through passage 21 places the space 4 and the valve 18 in communication, while the passage 22 is closed, and air or gas, under pressure, is admitted through the valve 13, and valves 18 and 19. As much pressure can be used as the shell 1 will stand, since the lining 2 is subjected to no inequalities of pressure. As the last part of the charge leaves the egg the air pressure will be suddenly lowered, the rate of lowering depending on the supply and the size of the blow pipe. But this sudden lowering of the pressure in the container will not cause the lining to collapse as the pressure outside of the lining will instantly fall, due to the fact that the air supply line is in communication, at the connection 9, with both sides of the lining. The air pressure will seek the line of the least resistance, i. e. by-pass to the delivery receptacle D (Fig. 5) by way of the container 2. If it is desired that the blowing be stopped more quickly than can be done by cutting off the air supply, the valve 17 can be opened which will allow the air to escape through the catch box 11.

As to the details:

The catch box 11 is provided with a drain cock 27. The valve 19, with the side passage 22, provides for the draining of any condensate from the space 4, when the valve 19 is turned to close the passage to the valves 16 and 18 and open the space to the atmosphere. The shell 1 is of cylindrical form with its lower end in the form of a bulged head as shown; the pipe 20 is threaded into this head. The upper end of the receptacle 1 carries a flange 28 to which the cover 29 is bolted by the bolts 30, a suitable gasket 31 being inserted. This cover carries the pipes 32, 33, and 34, screwed therein, and each carrying a flange 32ª, 33ª, or 34ª. The pipes 5, 24, and 23 each carry a flange 5ª, 24ª, or 23ª, for bolting to, and coöperation with, the flanges 32ª, etc., for connecting the pipes to the cover's pipes.

In the present instance, the lining, or receptacle 2, is of lead, similar in form to the outer receptacle 1, and, of course, closed except for the outlets to the pipes 5, 24, and 23. For the outlets, the top of the receptacle 2 carries lead pipes 35, 36 and 37 burned thereto and for projection into the pipes 32, 33, and 34, neatly jamming into the same and extending a short distance above them. At their upper ends the pipes 35, 36, and 37 are spread and beaten down to form flange-like gaskets 35ª, 36ª, and 37ª. Similarly, the lead linings of pipes 23 and 24 are spread and beaten down to form gaskets 23ᵇ and 24ᵇ. In Fig. 4, the connection at pipe 34 is illustrated on an enlarged scale and it will be understood that this is typical of that at 33, and, except for the omission of a gasket as 23ᵇ, of that at 32.

Should it be desired to insert a steam coil 38 (dotted lines, Fig. 5) its connections 39 and 40 may be made through the cover 29 in a way similar to that used for the pipes 36 and 37.

It is desirable to paint the inside surface of the receptacle 1 with acid proof paint to protect the steel or iron against any volatile acid fumes that might happen to accidentally get in through the pressure or suction line. While I prefer to make the lining 2 of lead it is understood that I may use other material which is not attacked or corroded by the particular liquid that is to be handled.

Although I have described my invention as embodied in a blow case arranged so that the suction, or pressure, applied to the inside of the lining is from the same source that applies the suction, or pressure, to the outside of the lining, it will be understood, of course, that such an arrangement, while convenient, is not essential, it being sufficient that the same pressure, or suction, in the sense of degree and not of course, be applied to the two sides of the lining. So that, in the appended claims, references to the "same" absolute pressure, and so forth, have reference to the degree, the source being the same or different as the case may be.

I claim:—

1. In an apparatus of the character indicated, in combination, a blow case element for handling fluid and comprising an inner and an outer receptacle spaced from each other to furnish an intermediate space, a container element for the fluid, fluid conveying connections between the inner receptacle of the blow case element and the container element, means for creating a desired absolute pressure in the inner receptacle thereby to move the fluid from one said element to the other, and means whereby the same absolute pressure is created in said space and applied to the exterior of said inner receptacle, as is created in, and applied to, the interior, whereby the pressure upon said inner receptacle is equalized.

2. In a blow case, in combination, an outer receptacle, an inner lining receptacle received in the outer receptacle and spaced therefrom, fluid conveying means in connection with said inner receptacle, and means providing for the application of the same absolute pressure to the inside of said inner receptacle and to the space between the two receptacles, thereby providing for the movement of the fluid being handled and equality of pressure on both sides of said inner lining receptacle.

3. In a blow case, in combination, an outer receptacle, an inner lining receptacle received in the outer receptacle and spaced therefrom, fluid conveying means in connection with said inner receptacle, means providing for the application of suction to, and means providing for the alternative application of pressure to, the inside of said inner receptacle and the space between the two receptacles, thereby providing for the drawing of fluid into the case and the forcing of the fluid out of the case, with equality of absolute pressure on both sides of said inner receptacle.

4. In a blow case, in combination, an outer receptacle, an inner lining receptacle received in the outer receptacle and spaced therefrom, fluid conveying means in connection with said inner receptacle, and means for the application of desired absolute pressure to the inside of said inner receptacle and to the space between the two receptacles, such means being in the character of piping including a pipe entering the inner receptacle, a pipe entering said space, and a main pipe, said three pipes being in free communication each with the other.

5. In a blow case, in combination, an outer receptacle, an inner lining receptacle in the outer receptacle and spaced therefrom, fluid conveying means in connection with the inner receptacle, and means whereby suction can be applied to the inside of said inner receptacle and to said space, such means being in the character of line piping with a catch box inserted in the line.

6. In a blow case, in combination, an outer receptacle, an inner lining receptacle in the outer receptacle and spaced therefrom, inflow and outflow fluid conveying means in connection with said inner receptacle, a main pipe whereby fluid under pressure may be supplied, a pipe connecting said main pipe and the space between said receptacles, a pipe connecting said main pipe and the interior of said inner receptacle, a second main pipe whereby suction may be applied, a pipe connecting said second named main pipe with the space between said receptacles, a pipe connecting said second named pipe with the interior of said inner receptacle, and suitable valves arranged in certain of said pipes and in said fluid conveying means whereby suction may be applied to the interior of said inner receptacle to draw fluid through the inflow means and at the same time the suction may be applied to said space, and whereby, alternatively, fluid under pressure may be supplied to the interior of said inner receptacle to force the conveyed fluid through the outflow means and at the same time the pressure fluid may be supplied to said space.

7. In a blow case, in combination, an outer receptacle provided with a pipe, and an inner receptacle received in the outer receptacle and spaced therefrom to provide an intermediate space, said inner receptacle being provided with a pipe positioned, and of a diameter, for reception in said first named pipe, said pipes having provisions for the one sealing the other, thereby to seal said space from the atmosphere.

8. In a blow case, in combination, an outer receptacle provided with a pipe having a flange at the outer end, and an inner receptacle received in the outer receptacle and spaced therefrom to provide an intermediate space, said inner receptacle being provided with a pipe positioned, and of a diameter, for reception in said first named pipe, said second named pipe being of greater length than the first named pipe and of malleable material, whereby the malleable pipe extends beyond the flange of the first named pipe in position to be turned down upon said flange to form a gasket and seal said first mentioned pipe, thereby to seal said space from the atmosphere.

9. In a blow case, in combination, an outer receptacle, an inner lining receptacle received in the outer receptacle and spaced therefrom, fluid conveying means in connection with said inner receptacle, and means for the application of desired absolute pressure to the inside of said inner receptacle and to the space between the two receptacles, there being means whereby change of absolute pressure upon one side of said inner receptacle is transmitted to the other.

10. In a blow case, in combination, an outer receptacle, an inner receptacle in the outer receptacle, fluid conveying means in connection with one of said receptacles, and means providing for the application of the same absolute pressure to both sides of one of the receptacles, thereby providing for the movement of the fluid being handled and equality of pressure on both sides of said second named receptacle.

In testimony whereof I affix my signature.

MAURICE B. COOKE.